Patented Mar. 20, 1923

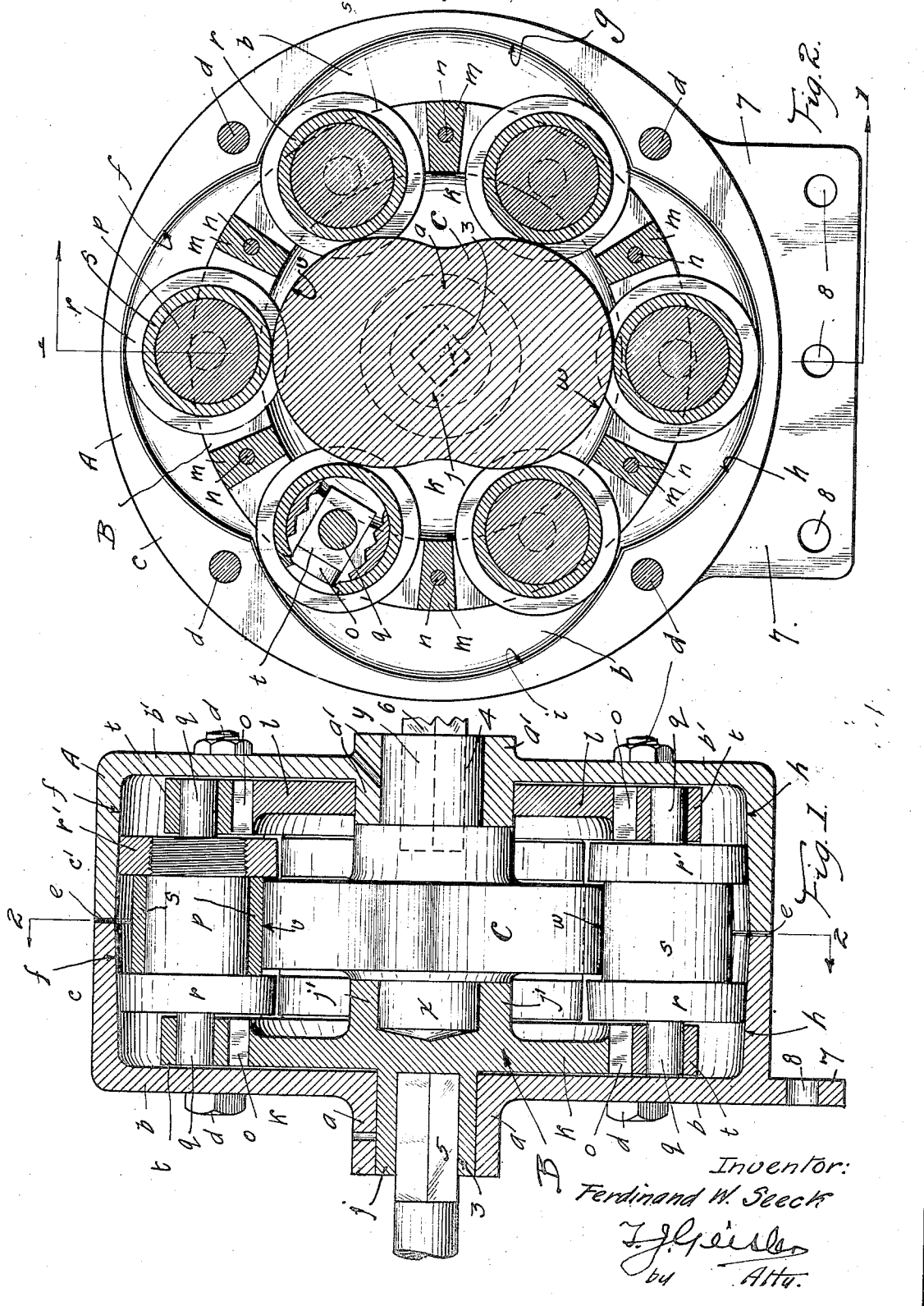

1,449,352

UNITED STATES PATENT OFFICE.

FERDINAND W. SEECK, OF LEBANON, OREGON.

GEARLESS PLANETARY TRANSMISSION.

Application filed September 20, 1921. Serial No. 501,879.

*To all whom it may concern:*

Be it known that I, FERDINAND W. SEECK, a citizen of the United States, and a resident of the city of Lebanon, county of Linn, and State of Oregon, have invented a certain new and useful Improvement in Gearless Planetary Transmission, of which the following is a specification.

My invention has for its object the providing of an improved type of planetary transmission in which differential motion will be transmitted thru a train of cams and rollers, and in which the parts are so arranged as to minimize the loss of power by friction of the moving parts upon each other.

A still further object of my invention is to provide a construction of compact form, all parts of which are readily accessible and removable, yet, at the same time, possessing great strength and rigidity, suitable for the purposes attained.

I attain my object by the device illustrated in the accompanying drawings:

Fig. 1 is a section taken on a plane corresponding to he broken line 1—1 of Fig. 2; and Fig. 2 is a section of the broken line 2—2 of Fig. 1.

My device comprises three annular members, A, B, C, concentric about a common center. One of said members is stationary, and the other two are revolved about said center. The outer and inner members A and C are spaced apart, as shown in Fig. 2, and are provided with opposed cam surfaces, and the member B is located between said cam surfaces and comprises an annular body in which are journalled a series of rollers; the roller carrying means being adapted to permit the rollers radial movement with respect to said common center. The number of cam surfaces of one of said spacing members A and C must be greater than that of the other, and the number of rollers journalled in the intermediate member B must be equal to, or multiples of, the cam surfaces provided on each of the members A and C.

Describing now the details of my device as shown in the drawings:

The outer cam member A consists of a divided annular shell, the two halves of which comprise central hubs $a$ and $a'$, web sides $b$ and $b'$, and complementary rim sections $c$ and $c'$. The halves of this shell are clamped together by bolts $d$, and shims $e$ permit a limited adjustment of these parts to or from each other. The interior of the rim sections $c$, $c'$ of the shell is formed with a series of concave cam-surfaces $f$, $g$, $h$ and $i$, these surfaces preferably being made with a conical taper toward the web sides $b$ and $b'$.

The intermediate roller element B is a cage consisting of web sides $k$ and $l$, of which the web side $k$ is provided with an outer hub $j$, journalled in the hub $a$ of the half $b$ of the outer cam member A, and provided further with an inner hub $j'$ alined with the hub $j$. The web sides $k$ and $l$ are parallel and spaced apart, and are tied together at intervals by the cross arms $m$ as shown in Fig. 2. For convenience in assembling, these cross arms are not solid, but are made with a parting line, and are clamped together by the machine screws $n$. The web side $l$ is journalled on the hub $a'$ of the half $b'$ of the outer shell A, and thus maintains the parts in true axial alinement.

The web sides $k$ and $l$ are made with openings $o$ which are radial to said common center, and in which cross-heads $t$ slide. Rollers $p$ are journaled in said cross-heads. Each of the rollers is made with journal ends $q$, and an integral peripheral flange $r$ at one end. A roller-bearing sleeve $s$ is mounted on each and companion flange $r'$ is threaded on the opposite end of the rollers and holds the roller bearing-sleeves against longitudinal displacement. The rims of the flanges $r$ and $r'$ are beveled to conform with the said taper of the cam surfaces $f$, $g$, $h$ and $i$, on which said flanges bear.

The inner cam-member C comprises a body having two trunnions $x$ and $y$, and made with two convex cam surfaces $v$ and $w$ upon which the roller-bearing sleeve $s$ bears. The trunnion $x$ is journalled in the inner hub $j'$ of the intermediate roller member B, and the trunnion $y$ is journalled in the hub $a'$ of the half or side $b'$ of the outer member A. Squared sockets 3 and 4 provided in the outer hub $j$, of the intermediate member B and trunnion $y$ of the inner member C respectively, are adapted to accommodate the squared ends of shafts 5 and 6.

A flange 7 on the half $b$ of the outer shell A is provided with bolt holes 8 so that the outer shell of my device may be secured to some rigid support.

The diameters of the rollers $p$ and roller bearing sleeves $s$, and the profiles of the cam surfaces $f$, $g$, $h$, $i$, $v$ and $w$, are such as to insure a tight rolling contact between all parts at all times; the cross head bearings $t$ of the rollers permitting the latter to accommodate themselves to the various positions of the parts of my mechanism, during its cycle of operation.

The general operation of my device is as follows:

Assuming that the outer shell A is held stationary, and the intermediate, roller element B is driven in a clockwise direction with reference to Fig. 2: the frictional contact of the flanges $r$ and $r'$ of the rollers $p$ with the outer cam surfaces $f$, $g$, $h$ and $i$ of the outer element A will cause the rollers to be driven counter-clockwise. Since the intermediate roller element B revolves, the cam-surfaces $f$, $g$, $h$ and $i$ of element A will successively exert a pressure on the flanges $r$ and $r'$ of the rollers $p$, thereby forcing the latter toward the center of rotation, such movement being accommodated by the sliding cross-head bearings $t$. As each roller is forced toward the center of rotation, the roller bearing sleeves $s$, bearing on the inner cam surfaces $v$ and $w$ of the inner element C will exert an inclined plane action, thereby causing the member C to be driven in a clockwise direction. This motion of the inner cam member C will be uniform and continuous, and its speed will be three times that of the intermediate member B, assuming the parts to be arranged as shown in the drawings.

By varying the number of cam surfaces on the outer and inner members A and C, and varying the number of interposed rollers of the intermediate member B, any required reduction or increase of speed may be attained. Further, by holding the intermediate member B stationary, and driving the other members not so held, the direction of transmitted motion may be reversed.

In the event that the roller members wear, the outer shell may be drawn up after first removing one of the shims $e$, and all loose play thereby eliminated. The conical taper of the cam surfaces of the outer member A and of the flanges of the rollers are provided to permit said adjustment to take up wear; and the roller bearing sleeves and the making of one of said flanges removable serves the same end.

The details of construction are variable to suit the manufacturer of my device.

I claim:

1. A gearless planetary transmission comprising three annular members arranged concentric about a common center, one of said members being stationary and the other two members being revolvable about said center, two of said members being spaced apart and provided with opposed cam surfaces, the other member being located between said opposed cam surfaces, and comprising an annular body and a series of rollers journalled therein, the roller carrying means being adapted to permit the rollers radial movement with respect to said center, the number of cam surfaces of one of said spaced members being greater than that of the other.

2. The combination described in claim 1 distinguished in that the number of rollers is equal to the sum of the cam surfaces provided on both of said spaced members.

3. The combination described in claim 1 distinguished in that the number of rollers is a multiple of the sum of the cam surfaces provided on both of said spaced members.

4. A gearless planetary transmission comprising three members arranged concentric about a common center, one of said members consisting of a divided shell, the halves of which are provided with complementary rim sections, the inner surfaces of which are provided with cam surfaces, the inner of said three concentric members also being provided with cam surfaces spaced from said first mentioned cam surfaces, the number of the cam surfaces of one of said spaced members being greater than that of the other, the intermediate of said three members comprising an annular body carrying rollers, the roller carrying means being adapted to permit the rollers radial movement with respect to said center, said rollers having flanges at their ends, said flanges bearing on the cam surfaces of said outer member or shell, roller-bearing sleeves mounted on the rollers between said flanges and bearing on the cam surfaces of said inner member, the number of rollers being a multiple of the sum of said cam surfaces provided on said outer and inner members.

5. A gearless planetary transmission comprising three members arranged concentric about a common center, one of said members consisting of a divided shell, the halves of which are provided with complementary rim sections, the inner surfaces of which are provided with cam surfaces, the inner of said three concentric members also being provided with cam surfaces spaced from said first mentioned cam surfaces, the number of the cam surfaces of one of said spaced members being greater than that of the other, the intermediate of said three members comprising an annular body, crossheads having radial movement with respect to said head, rollers journalled in said crossheads, said rollers having flanges at their ends, said flanges bearing on the cam surfaces of said outer member or shell, roller-bearing sleeves mounted on the rollers between said flanges and bearing on the cam surfaces of said inner member, the number of rollers being a multiple of the sum of said cam surfaces provided on said outer and inner members.

6. The combination set forth in claim 4 distinguished in that the cam surfaces of said outer member or shell have an outward conical taper and said flanges of the rollers having a corresponding taper, whereby a limited adjustment of two halves of the shell towards and from each other is permitted.

7. The combination set forth in claim 4 distinguished in that one of the flanges of said rollers is removable, for the purpose stated.

FERDINAND W. SEECK.